US012514993B2

(12) United States Patent
Khan et al.

(10) Patent No.: US 12,514,993 B2
(45) Date of Patent: Jan. 6, 2026

(54) SPACER DEVICE WITH FLOW RATE SPIROMETER

(71) Applicant: Aerovu Technologies, Inc., Oceanside, CA (US)

(72) Inventors: Khaja H. Khan, Oceanside, CA (US); Alex Stenzler, Long Beach, CA (US); Steve Han, Huntington Beach, CA (US)

(73) Assignee: AEROVU TECHNOLOGIES, INC., San Rafael, CA (US)

( * ) Notice: Subject to any disclaimer, the term of this patent is extended or adjusted under 35 U.S.C. 154(b) by 0 days.

(21) Appl. No.: 15/512,481

(22) PCT Filed: Sep. 18, 2015

(86) PCT No.: PCT/US2015/051037
§ 371 (c)(1),
(2) Date: Mar. 17, 2017

(87) PCT Pub. No.: WO2016/044775
PCT Pub. Date: Mar. 24, 2016

(65) Prior Publication Data
US 2017/0274161 A1    Sep. 28, 2017

Related U.S. Application Data

(60) Provisional application No. 62/052,711, filed on Sep. 19, 2014.

(51) Int. Cl.
*A61M 15/00*  (2006.01)
*A61B 5/08*   (2006.01)
(Continued)

(52) U.S. Cl.
CPC ....... *A61M 15/0016* (2014.02); *A61B 5/0816* (2013.01); *A61B 5/0875* (2013.01);
(Continued)

(58) Field of Classification Search
CPC .......... A61M 15/0001; A61M 15/0005; A61M 15/0006; A61M 15/0008; A61M 15/0011;
(Continued)

(56) References Cited

U.S. PATENT DOCUMENTS 2,333,884 A * 11/1943 Porter ........................ G01F 1/22
                                                                      264/261
3,635,214 A    1/1972 Rand et al.
(Continued)

FOREIGN PATENT DOCUMENTS

CA    1 230 505 A    12/1987
EP    0938908    *   9/1999
(Continued)

OTHER PUBLICATIONS

Extended European Search Report issued on May 2, 2018, regarding EP 15 84 1983.

*Primary Examiner* — Jennifer Robertson
*Assistant Examiner* — Om Patel
(74) *Attorney, Agent, or Firm* — SNELL & WILMER L.L.P.

(57) ABSTRACT

The present invention provides a spacer device having a flow rate spirometer. The flow rate indicator allows users to use a measured, consistent flow rate leading to improved synchronicity and actuation.

23 Claims, 8 Drawing Sheets

(51) Int. Cl.
*A61B 5/087* (2006.01)
*A61K 31/137* (2006.01)
*A61M 16/00* (2006.01)

(52) U.S. Cl.
CPC .......... *A61B 5/0876* (2013.01); *A61K 31/137* (2013.01); *A61M 15/0021* (2014.02); *A61M 15/0026* (2014.02); *A61M 15/0086* (2013.01); *A61M 15/009* (2013.01); *A61M 2016/003* (2013.01); *A61M 2205/43* (2013.01)

(58) Field of Classification Search
CPC .......... A61M 15/0013; A61M 15/0015; A61M 15/0016; A61M 15/0018; A61M 15/002; A61M 15/0021; A61M 15/0026; A61M 15/0086; A61M 15/009; A61M 2016/003; A61M 2205/43; A61B 5/0875; A61B 5/0876; A61B 5/0816; A61K 31/137; A01K 39/024; A01K 7/04; A01K 1/0121; A01K 75/04; F16K 21/00; F16K 33/00; F17C 2250/0413; F16N 19/006
See application file for complete search history.

(56) References Cited

U.S. PATENT DOCUMENTS

| | | | | |
|---|---|---|---|---|
| 4,114,608 A | | 9/1978 | Russo | |
| 4,976,259 A | * | 12/1990 | Higson | A61M 15/0085 128/200.14 |
| 5,404,871 A | * | 4/1995 | Goodman | A61M 15/00 128/200.14 |
| 5,522,380 A | * | 6/1996 | Dwork | A61M 15/0086 128/200.23 |
| 5,676,130 A | * | 10/1997 | Gupte | A61M 15/0086 128/203.19 |
| 5,839,430 A | | 11/1998 | Cama | |
| 6,615,826 B1 | * | 9/2003 | Gabrio | A61M 11/001 128/200.14 |
| 6,955,169 B2 | | 10/2005 | Khan | |
| 8,807,131 B1 | * | 8/2014 | Tunnell | A61M 16/0051 128/200.23 |
| 8,940,683 B2 | | 1/2015 | Levitt | |
| 2004/0000307 A1 | * | 1/2004 | Khan | A61B 5/0876 128/200.22 |
| 2005/0123483 A1 | * | 6/2005 | Gamard | A61M 15/009 128/200.23 |
| 2010/0121211 A1 | * | 5/2010 | Bryant | A61B 5/0875 600/538 |
| 2010/0209357 A1 | * | 8/2010 | Levitt | A61K 31/70 424/45 |
| 2014/0166004 A1 | * | 6/2014 | Pierro | A61M 16/14 128/203.12 |

FOREIGN PATENT DOCUMENTS

| | | | | |
|---|---|---|---|---|
| WO | WO 1999/53982 A1 | | 10/1999 | |
| WO | WO-03089036 A1 | * | 10/2003 | ........ A61M 15/0086 |
| WO | WO-2011083377 A1 | * | 7/2011 | ........ A61M 15/009 |
| WO | WO-2013158738 A1 | * | 10/2013 | ........ A61M 16/20 |

* cited by examiner

SPACER DEVICE WITH FLOW RATE SPIROMETER

CROSS REFERENCE TO RELATED APPLICATION(S)

Cross-Reference to Related Applications

This application is a 35 USC § 371 National Stage application of International Application No. PCT/US2015/051037 filed Sep. 18, 2015; which claims the benefit under 35 USC § 119 (e) to U.S. Application Ser. No. 62/052,711 filed Sep. 19, 2014. The disclosure of each of the prior applications is considered part of and is incorporated by reference in the disclosure of this application.

FIELD OF THE INVENTION

The present disclosure describes a spacer device comprising a spirometer for use with an inhaler or inhaler canister.

BACKGROUND

An inhaler is a medical device used to deliver medication to a patient via the patient's lungs. The most commonly prescribed type of inhaler is the pressurized metered dose inhaler (pMDI), which is frequently used for the treatment of asthma and chronic obstructive pulmonary disease (COPD). There are wide variety of other types of inhalers that are also now commonly prescribed, such as the dry powder inhaler (DPI), breath-actuated metered dose inhaler (BAMDI), and soft mist inhaler.

The use of inhalers has been primarily focused on the treatment of asthma and COPD. However, with the development of technologies that permit the delivery of a wide variety of medication via an inhalation delivery route, a need has arisen to accurately deliver specified doses of drugs systemically for the treatment of a wide array of diseases. The inhalation delivery route for medication offers many potential advantages over oral delivery, such as eliminating the potential of poor absorption and/or high metabolism in the gastrointestinal tract and by passage of medication through the liver. See, e.g., the World Wide Web at howmed.net/pharmacology/routes-drug-administration. For example, a powdered form of recombinant human insulin for the treatment of diabetes may be delivered via inhalation. See, e.g., the World Wide Web at drugs.com/exubera.html.

Despite the wide use of inhalers, it is well documented that most patients do not use their inhalers correctly. See, e.g., the World Wide Web at topix.net/forum/health/TMPH2GC79MMRM1JFD; the World Wide Web at irishhealth.com/article.html?id=21997. The deposition of inhaled medication in the lungs depends on particle size, inhalation technique, and the type of inhaler device used. A complex interaction between these three factors results in a need for different techniques for different types of inhalers. See, e.g., Haughney, J., et al. "Choosing Inhaler Devices for People with Asthma: Current Knowledge and Outstanding Research Needs," *Respir. Med.* 2010, 104, 1237; Chrystyn, H., et al. "Not All Asthma Inhalers Are the Same: Factors to Consider when Prescribing an Inhaler," *Prim. Care Respir. J.* 2009, 18, 243. For example, patients using a pMDI should use a slower inhalation than patients using a DPI to achieve maximum effectiveness. See, e.g., the World Wide Web at ispub.com/IJPN/13/1/12568.

Current inhaler devices are highly inefficient, delivering a heterodisperse distribution of drug particle sizes where at most about 20% of the drug reaches the lungs. the World Wide Web at ncbi.nlm.nih.gov/pubmed/12897033. The clinical efficacy of inhalation therapy is highly dependent on the ability to deliver a sufficient dose of a drug to the lower respiratory tract. However, the majority of the drug delivered by currently used inhalers impacts the oropharynx instead of the lower respiratory tract and is thus wasted. Although using higher drug doses may compensate for this inefficiency and thereby achieve an adequate clinical response, the lack of precision of this approach leads to the undesired potential for adverse systemic effects.

Inhaled drug particles will deposit in different regions of a patient's lungs, depending on particle size. Particles that are less than about 1 micron in diameter are likely to reach the peripheral airways and alveoli or be exhaled, particles that are about 1-5 microns in diameter will deposit in the large and conducting airways, while particles larger than about 5 microns in diameter will predominately deposit in the oropharynx.

The total lung deposition of an inhaled drug is significantly impacted by the speed of inhalation. DPIs require a fast and deep inhalation to ensure the drug released by the inhaler device is deposited in the patient's lungs. A high inhalation rate is required to generate sufficient internal turbulent force in the inhaler device to break up the formulation of the metered dose to produce particles that are sufficiently small to penetrate the peripheral airways. Failure to achieve this high internal force increases the likelihood that the dose will impact in the patient's mouth and throat instead of his or her lungs. By contrast, aerosol inhalers such as the pMDI require a slow and deep inhalation, with an inspiratory flow rate of less than about 60 liters per minute. Because a pMDI inhaler generates its own aerosol, a slower inhalation rate is required to ensure that the drug deposits in the peripheral airways by ensuring the velocity of the drug particles is sufficiently low to minimize inertial impaction in the oropharynx as described above. While some of the effects of excessive inspiratory flow with a pMDI may be mitigated by modifying the particle size used in the aerosol, this is a non-ideal solution.

A significant proportion of patients with asthma and COPD have an inspiratory flow rate that is too high to properly use a pMDI, which may reduce clinical effectiveness of the medication delivered. See, e.g., the World Wide Web at medscape.org/viewarticle/757312_4. Other problems with pMDIs include patients' lack of coordination, inadequate breath hold, and overly rapid inhalation. Patients using DPIs also frequently make a variety of errors, including failing to hold the device upright, exhaling through the mouthpiece, shaking the device, failing to inhale forcefully, inhaling with an open mouth, and failing to maintain a tight seal between the mouthpiece and the patient's mouth. When inhaler devices are tested, patients are closely scrutinized and are provided with unlimited support to insure proper use. However, that level of education and support is seldom available in clinical practice. This ultimately leads to a discrepancy between the effectiveness of medication as reported in published studies and its actual effectiveness when prescribed to patients.

The most common problem in inhaler use is that of synchronicity between actuation of the inhaler and inhalation by the patient. Synchronicity is the correlation between the timing of drug release and a patient's inhalation, and the failure of the patient to begin the inhalation process at the correct time will result in less than ideal drug delivery. Patients are often confused about when to inhale, and most patients using inhalers either begin the inhalation process too soon or too late. Most inhalers do not address this very common error.

An inhaler may be used together with a spirometer to mitigate the above-identified problems, as disclosed in U.S. Pat. Nos. 5,431,154 and 5,522,380. U.S. Pat. No. 6,955,169 discloses an inhaler coupled with a float indicator to provide feedback regarding a user's inhalation progress.

A spirometer is a medical device used to measure the volume of air inspired and expired by a patient's lungs. A spirometer records the amount of air and the rate of air that a patient breathes in and out over a specified period, permitting precise measurement of respiration flow rates. An incentive spirometer is a spirometer that includes a visual component that provides a measurement of a patient's sustained inhalation vacuum to motivate the patient to improve lung functioning by attempting to achieve a specified goal. Incentive spirometers have been used primarily in patients post-operatively to prevent atelectasis and/or the development of pneumonia.

While current examples of inhalers used in conjunction with spirometers provide somewhat useful information, the information provided nonetheless falls short of providing clinicians and patients an accurate description of the inhalation process, such as information regarding the speed of the inspiratory flow or the amount of patient effort that is required. Thus there remains a need for an inhaler-spirometer combination device that can provide accurate information regarding the inspiratory flow rate.

SUMMARY OF THE INVENTION

The present invention provides an innovative spacer device including a spirometer for use with an inhaler or inhaler canister. In an embodiment, the spirometer used in the device is an incentive spirometer. The device may provide accurate information regarding a patient's inspiratory flow rate. In preferred embodiments, the device may comprise a holding chamber, a flow chamber, a spirometer, and a mouthpiece. The device may further include a flow chamber orifice that connects the flow chamber to the holding chamber and allows drug particles to be delivered from the holding chamber into the flow chamber. The spirometer may further comprise a float that rises and falls in the spirometer chamber according to the rate of inspiratory flow by the patient.

In one aspect, the invention provides a spacer device for use with a medicinal fluid canister. The device includes a flow chamber; a mouthpiece in fluid communication with the flow chamber; and a spirometer comprising: a fluid chamber having an upper and lower portion along an elongated central axis, the fluid chamber being in fluid communication with the flow chamber via a fluid pathway; a float slidably disposed within the fluid chamber; and an entrainment port disposed within a wall of the fluid chamber.

In another aspect, the invention provides a system for administering a medicinal agent to a subject. The system includes a spacer device of the disclosure and a medicinal fluid canister in fluid communication with the spacer device.

In a related aspect, the invention provides a method of administering a therapeutic agent to a subject utilizing the device or system of the invention.

In another aspect, the invention provides a method of treating a disease or disorder in a subject. The method includes administering a medicinal agent to the pulmonary tract of the subject using the device or system of the invention.

BRIEF DESCRIPTION OF THE FIGURES

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION

Figure 1:
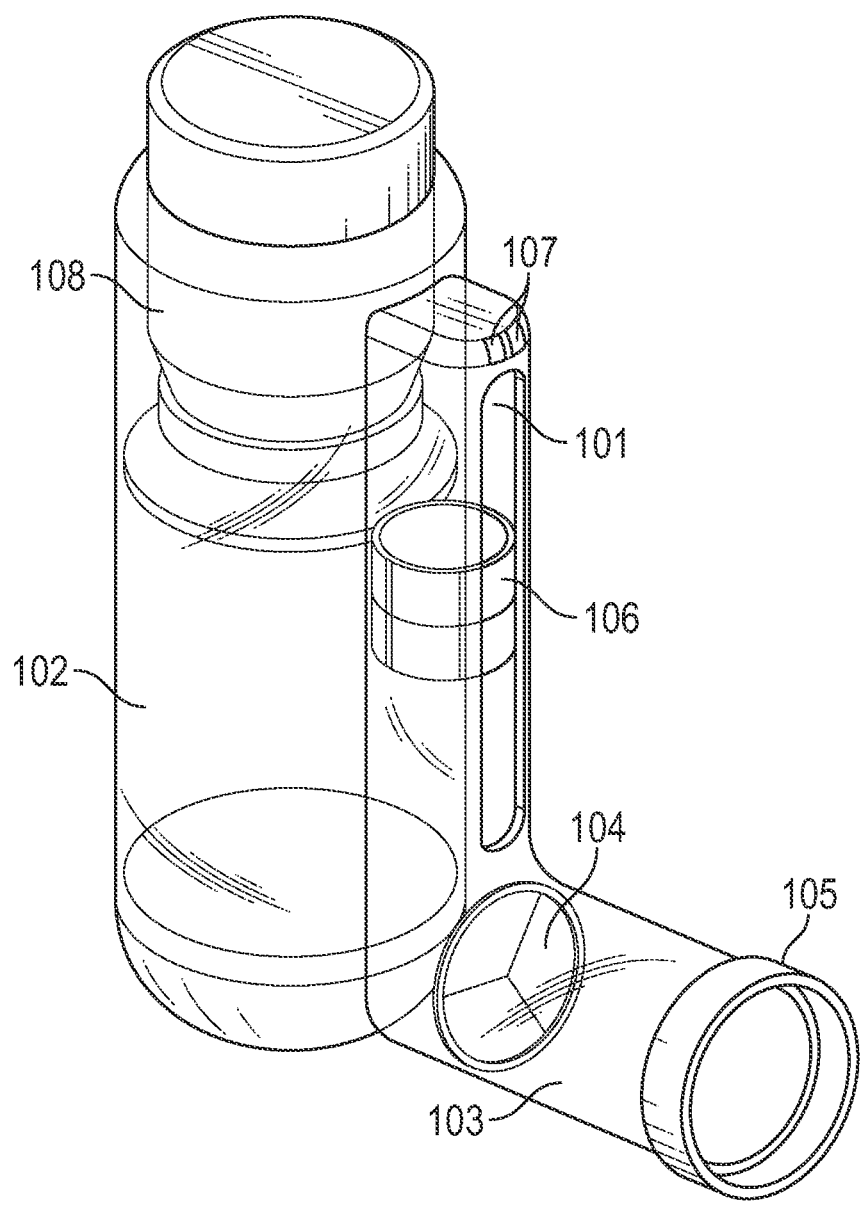
FIG. 1 shows a spacer device with an inhaler canister attached thereto in one embodiment of the invention.

The invention relates to a spacer device for use with an inhaler canister. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

The present disclosure describes a spacer device comprising a spirometer for use with an inhaler or inhaler canister that can provide accurate information regarding a patient's inspiratory flow rate. The device may comprise a holding chamber, a flow chamber, a spirometer, and a mouthpiece. The device may further comprise a flow chamber orifice that connects the flow chamber to the holding chamber and allows drug particles to be delivered from the holding chamber into the flow chamber. In some embodiments, the spirometer may further include a float that rises and falls in the spirometer chamber according to the rate of inspiratory flow by the patient.

In order for patients to use an inhaler correctly and derive benefit, patients must be able to utilize a consistent and measured flow rate to direct the inhaler particles into their airways.

Spacers and holding chambers are commonly prescribed for patients with Asthma and COPD. These devices contain the inhaler actuated particles in a chamber or space and allow users more time to breathe the medication in.

Although spacers and holding chambers are useful in some patients, they do not however prevent people from inhaling too fast or too slow, leading to a reduce benefit.

Some users mistakenly think that a correct inspiratory maneuver was utilized when a whistle sound is made from the spacer or holding chamber. Most holding chambers and spacers come equipped with this feature that alerts users after an inspiratory effort has ended and if a high flow rate was used.

A need exists for a device that provides users with a visual, timely and immediate feedback of the inspiratory flow rate being utilized from the beginning and up until the conclusion of the inspiratory effort.

The advantage of this information is that it will allow users to detect and adapt their inspiratory maneuver if needed, to insure a laminar flow pattern is maintained. A laminar flow of air is needed to traverse the oropharyngeal anatomy and direct the particles into the airways.

A flow rate feature allows users to use a measured, consistent flow rate leading to improved synchronicity and actuation. The perception problem of a fast or slow inspiratory flow rate will be greatly minimized.

As discussed above, Asthma and COPD are treated by inhaled medications. A MDI inhaler is the most commonly prescribed device given to people to help manage and alleviate symptoms such as wheezing, shortness of breath, and to reduce airway inflammation.

The meter dose inhaler (MDI) consists of a pressurized canister that houses a propellant and medication which when activated, releases a fine plume of aerosol. The aerosol is expected to be inhaled slowly and optimally at about 30 l/min and deeply followed by a breath hold to allow for the particles of the drug to deposit deep in the lungs. This technique while ideal is especially challenging for patients who suffer from Asthma and COPD who's airways tend to be narrow or obstructed. In addition, elderly and young children who have fine motor control problems, arthritis, or finger and hand weakness will be unable to benefit from this device. The problem of inhaler misuse is widely known in the industry and information is widely available on this topic from the NIH, CDC, American Association of Respiratory Care and many other reputable medical journals.

A dry powder inhaler (DPI) was developed to help resolve this technique dependent MDI delivery device. A DPI has a powdered form of the drug that is placed in blister packs or pills and is breath activated and uses no propellant to aerosolize. DPI's require the patient to have a rapid and high inspiratory flow rate to de-aggregate and disperse the medication being held inside the device. Delivery of the drug will be reduced if the patient is unable to generate the minimum required inspiratory flow rate between 28 l/min with some DPI's requiring as high as 60 l/min. COPD patients and the elderly in studies have shown that many are unable to generate the inspiratory flow rates needed to benefit. Common DPI errors include failure to hold the device upright, exhaling through the mouthpiece, shaking the device, failing to inhale forcefully, and inhaling with an open mouth/failing to maintain a tight seal. See, Lavorini, et al. "Effect of incorrect use of dry powder inhalers on management of patients with asthma and COPD," *Respir Med.* 2008; 102 (4):593-604; see also, Schulte et al. "Handling of and preferences for available dry powder inhaler systems by patients with asthma and COPD," *J Aerosol Med Pulm Drug Deliv.* 2008; 21(4):321-328.

The role of inspiratory flow in both MDI and DPI devices is crucial in that unless a minimum inspiratory flow is achieved, drug deposition remains reduced and has little to no benefit to the patient. The present invention addresses this problem.

Figure 4:
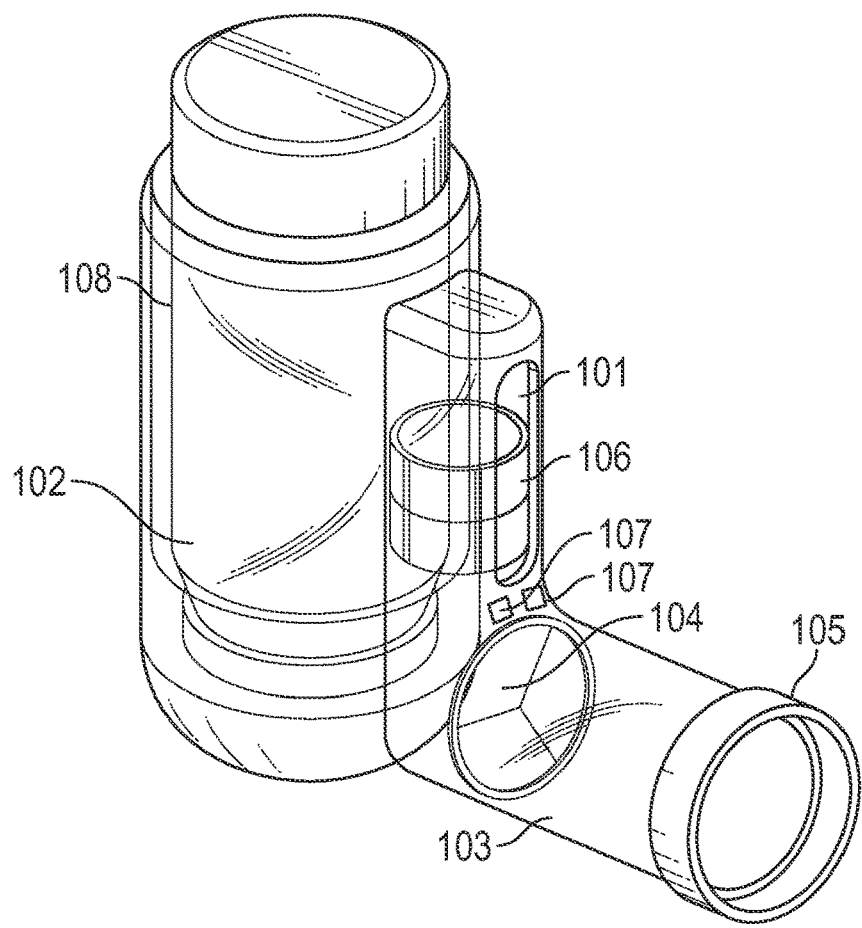
FIG. 4 shows a spacer device in one embodiment of the invention with an inhaler canister attached thereto.
Figure 7:
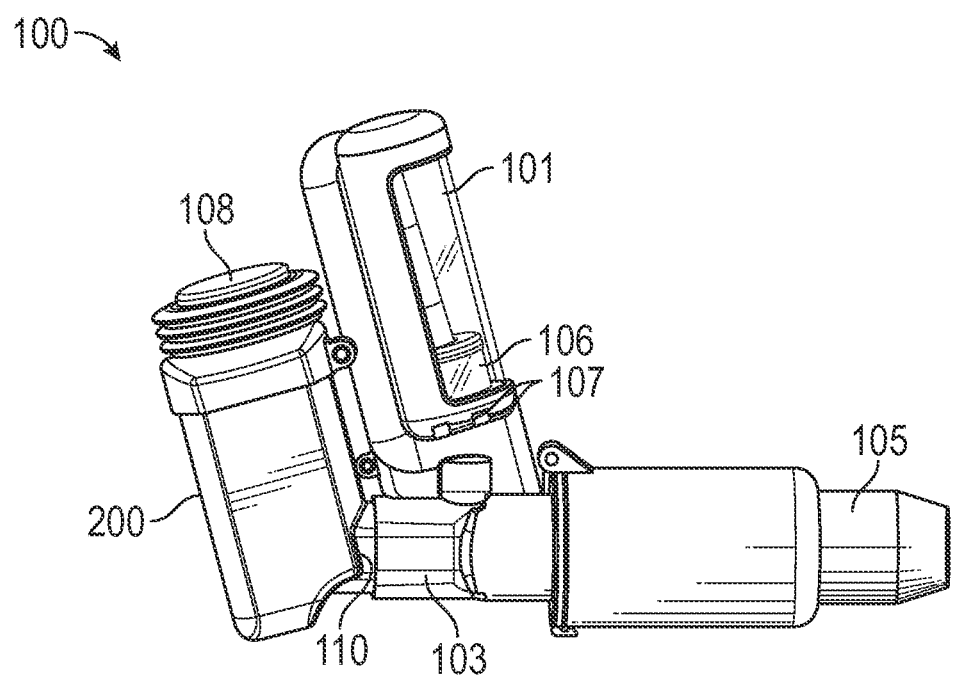
FIG. 7 shows a side view of a spacer device engaged with an inhaler device including a canister in one embodiment of the invention.

In embodiments, the spirometer used in the device is an incentive spirometer. An example of such a device is shown in FIGS. 1,4 and 7. The device preferably provides a visual indicator of the inspiratory flow rate generated by a patient and thereby enables the patient to self-correct if the patient's inspiratory flow rate is insufficient to ensure proper drug delivery will occur. Upon inspiration by the patient, the float will rise to indicate the inspiratory flow rate. The inspiratory flow rate is a function of both the speed and depth of a patient's inhalation, wherein speed describes how fast the patient is inhaling and depth describes how deep the inhaled particles penetrate into the lungs when the patient causes the spirometer float to contact the top of the spirometer chamber.

The disclosed device may provide several additional advantages over existing inhaler devices. For example, the device may reduce problems with synchronicity. The spirometer's observable rising and falling action may alert the patient regarding when the patient's inhalation is actually occurring and allows the patient to better synchronize inhalation with the release of the drug. Moreover, the device may provide the patient a visual incentive to inspire and attempt to achieve a target level of inspiration.

In addition, the internal resistance provided by the spirometer may slow the inhalation process, allowing laminar flow of air to occur. When used with an aerosol inhaler such as a pMDI, this slow, laminar flow of air guides the aerosolized drug particles released by the inhaler into the peripheral airways rather than the oropharynx.

In some embodiments, the spirometer may be designed to move upward slowly to the optimal flow rate. This visual aid may allow a patient to self-correct errors in inhalation technique, as the indicator will only rise upon inspiration and not exhalation. Moreover, since aerosol inhalers such as the pMDI require a slow and deep inhalation to ensure that the aerosolized drug particles deposit in the peripheral airways, slow movement of the spirometer will enhance drug delivery.

In some embodiments, a device may include a visual indicator as well as one or more indicators such as an auditory indicator. For example, the device may produce a specific noise once the preferred flow rate is maintained or while the optimal flow rate is not maintained. Additionally, a visual indicator may be a light or the like that turns on or off once the optimal flow rate is achieved or not achieved.

In embodiments, the spirometer may be calibrated according to a preferred range of inspiratory flow rates.

In some embodiments, the spirometer may be labeled with graduated flow rate markings to provide accurate information regarding a patient's inspiratory flow rate. In other embodiments, the spirometer may be labeled with zones to indicating poor, moderate, and good inspiratory flow. The markings may be visible through a transparent window of the wall of the spirometer.

Figure 2A:
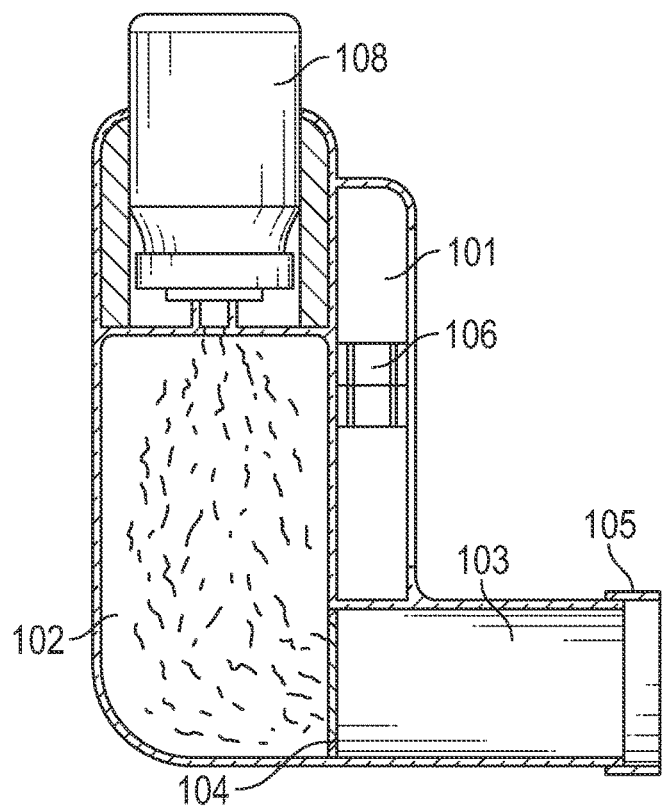
FIG. 2A shows a spacer device in one embodiment of the invention with an inhaler canister attached thereto wherein the inhaler canister has been actuated to deliver a drug into the holding chamber.
Figure 2B:
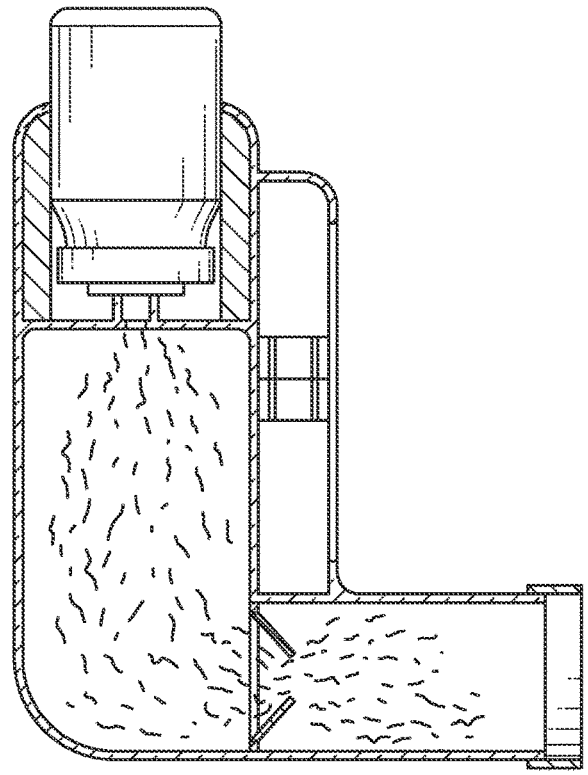
FIG. 2B shows a spacer device in one embodiment of the invention with an inhaler canister attached thereto wherein the inhaler canister has been actuated to deliver a drug into the holding chamber and a patient has begun inspiration to cause the drug to flow from the holding chamber into the flow chamber.

FIGS. 1 and 2 show an embodiment of the spacer device comprising a spirometer 101, a holding chamber 102, a flow chamber 103, a flow chamber orifice 104, and a mouthpiece 105, wherein the spirometer further comprises a float 106 and entrainment ports 107. The float 106 may preferably be a piston-type float and not a ball-type float. An inhaler canister 108 is shown attached to the device shown in FIGS. 1 and 2.

Figure 3:
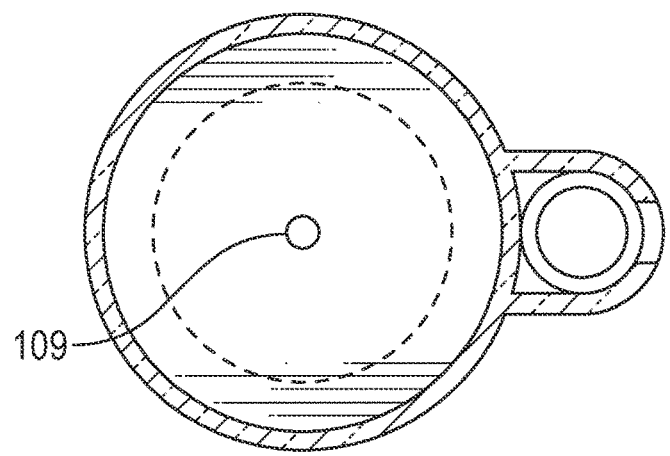
FIG. 3 shows a top view of a spacer device in one embodiment of the invention showing an opening where the inhaler canister may be attached.

FIG. 3 shows a top view of an embodiment of the spacer device comprising an opening 109 where an inhaler canister may be attached. Once the inhaler canister is attached, it may be actuated to release a drug into the holding chamber 102, as shown in FIG. 2A. The holding chamber acts as a reservoir for the drug and gives a patient a window of time before the patient must begin inspiratory effort. To begin an inspiratory effort to withdraw the medication from the holding chamber, the patient places mouthpiece 105 into his or her mouth and then begins to inspire. The aerosolized medication then begins to flow through flow chamber orifice 104 into flow chamber 103. As the patient begins to inspire the aerosolized drug particles through the mouthpiece, air is simultaneously withdrawn from the top of the holding chamber and through entrainment ports 107. This creates a pressure difference within the spirometer chamber, allowing float 106 to rise.

Figure 6:
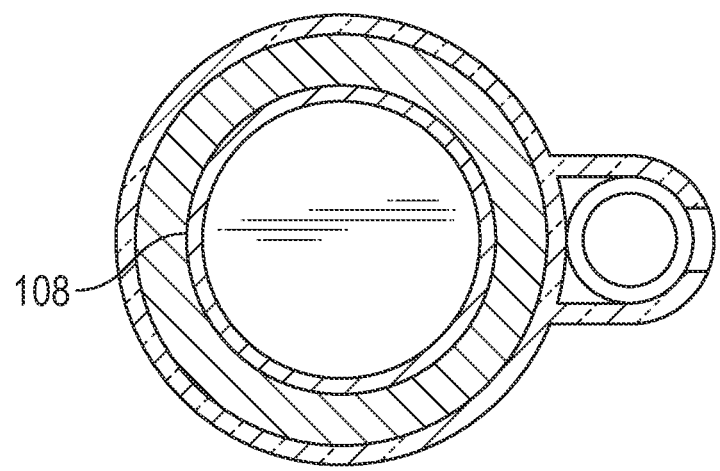
FIG. 6 shows a top view of a spacer device in one embodiment of the invention showing an opening where the inhaler canister may be attached.

FIGS. 4 and 6 show an embodiment of the spacer device comprising a spirometer 101, a holding chamber 102, a flow chamber 103, a flow chamber orifice 104, and a mouthpiece 105, wherein the spirometer further comprises a float 106 and entrainment ports 107. The float 106 may preferably be a piston-type float and not a ball-type float. An inhaler canister 108 is shown attached to the device shown in FIGS. 1 and 2.

Figure 5A:
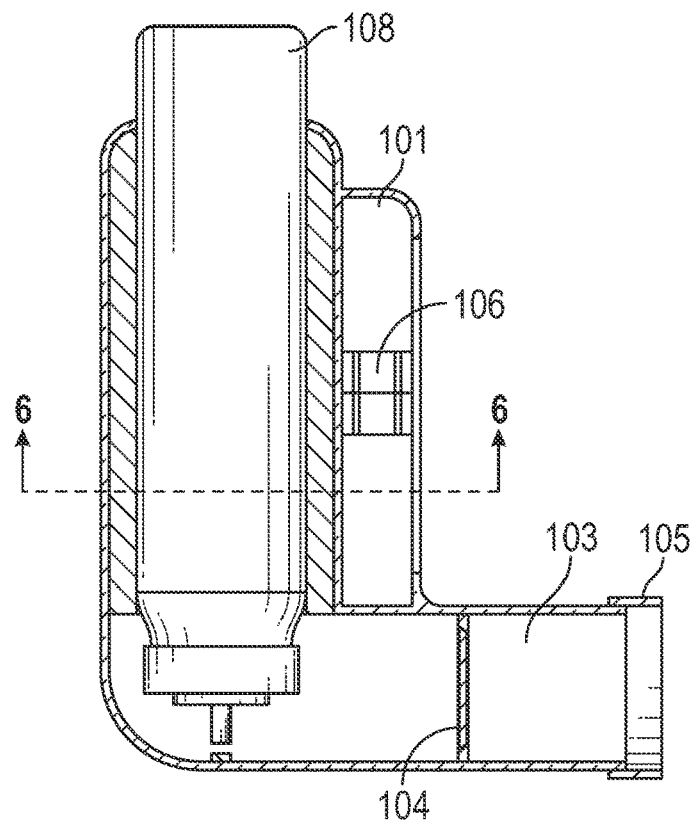
FIG. 5A shows a spacer device in one embodiment of the invention with an inhaler canister attached thereto wherein the inhaler canister has been actuated to deliver a drug into the holding chamber.
Figure 5B:
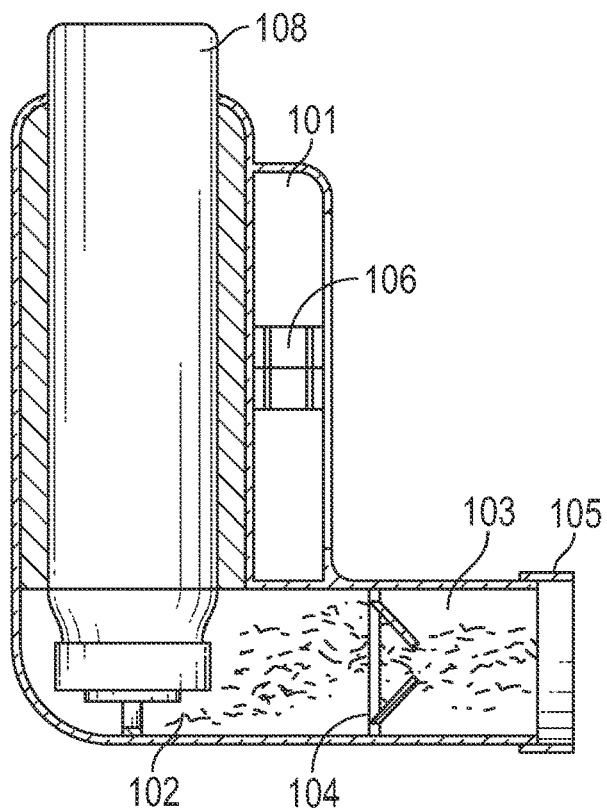
FIG. 5B shows a spacer device in one embodiment of the invention with an inhaler canister attached thereto wherein the inhaler canister has been actuated to deliver a drug into the holding chamber and a patient has begun inspiration to cause the drug to flow from the holding chamber into the flow chamber.

FIG. 6 shows a top view of an embodiment of the spacer device comprising an opening 109 where an inhaler canister may be attached. Once the inhaler canister is attached, it may be actuated to release a drug into the holding chamber 102, as shown in FIG. 5A. In this embodiment, the holding chamber 102 has a reduce volume as compared to the device shown in FIG. 1. As with the embodiment shown in FIG. 1, to begin an inspiratory effort to withdraw the medication from the holding chamber, the patient places mouthpiece 105 into his or her mouth and then begins to inspire. The aerosolized medication then begins to flow through flow chamber orifice 104 into flow chamber 103. As the patient begins to inspire the aerosolized drug particles through the mouthpiece, air is simultaneously withdrawn from the top of the holding chamber and through entrainment ports 107. This creates a pressure difference within the spirometer chamber, allowing float 106 to rise.

FIGS. 7-13 show an embodiment of the spacer device where the medicinal fluid canister is housed in a conventional inhaler device 200 which is separable from the spacer device 100. The mouthpiece 110 of the inhaler device engages an opening 112 in the flow chamber 103 of the spacer device to form a fluid connection with the medicinal fluid canister 108.

The spacer device includes a spirometer 101, a flow chamber 103, and a mouthpiece 105, wherein the spirometer further comprises a float 106 and entrainment ports 107. The float 106 may preferably be a piston-type float and not a ball-type float. An inhaler canister 108 is shown attached to the device shown in FIGS. 7-13 via inhaler device 200.

Figure 8:
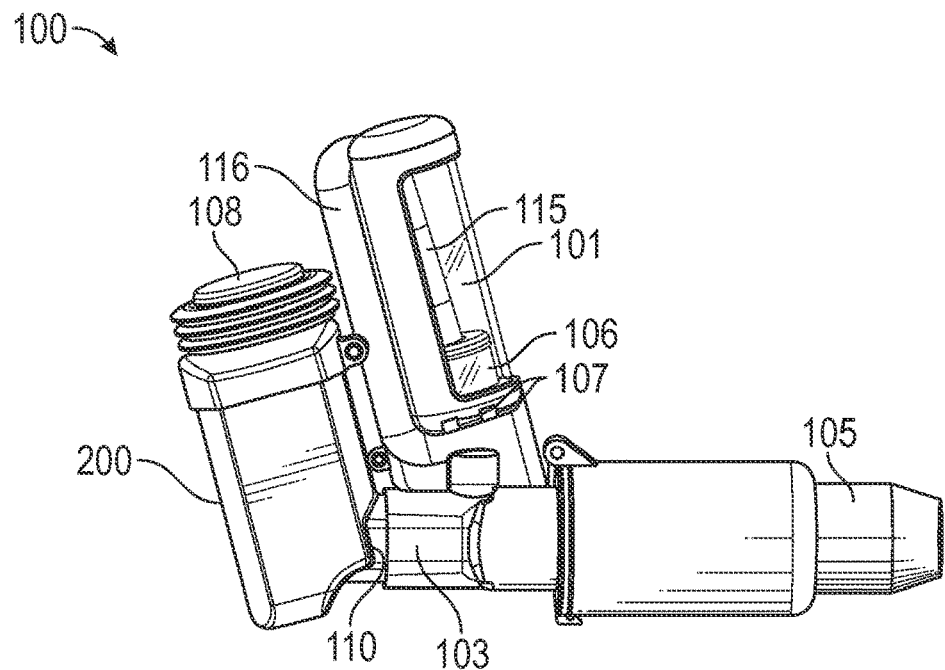
FIG. 8 shows a side view of a spacer device engaged with an inhaler device including a canister in one embodiment of the invention.
Figure 9:
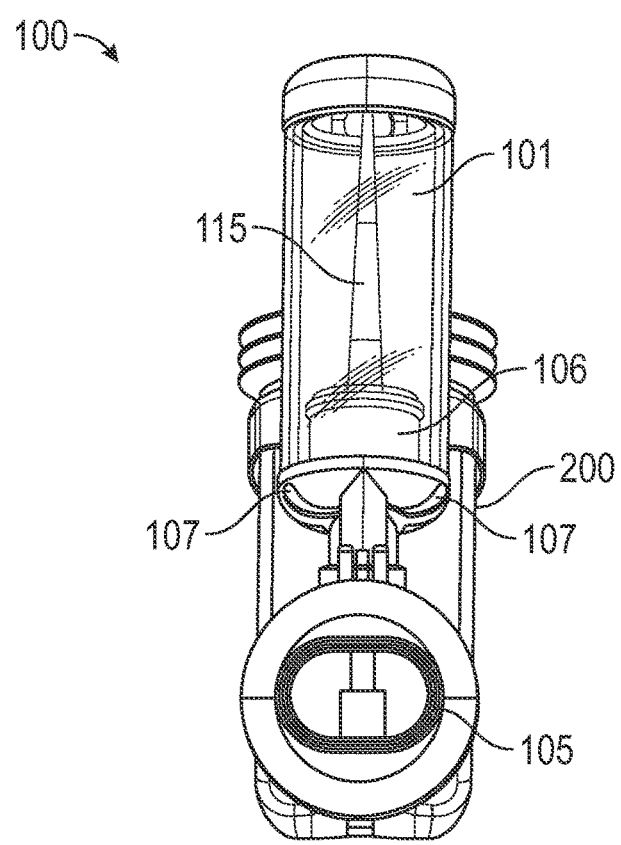
FIG. 9 shows a front view of the spacer device of FIG. 8.
Figure 10:
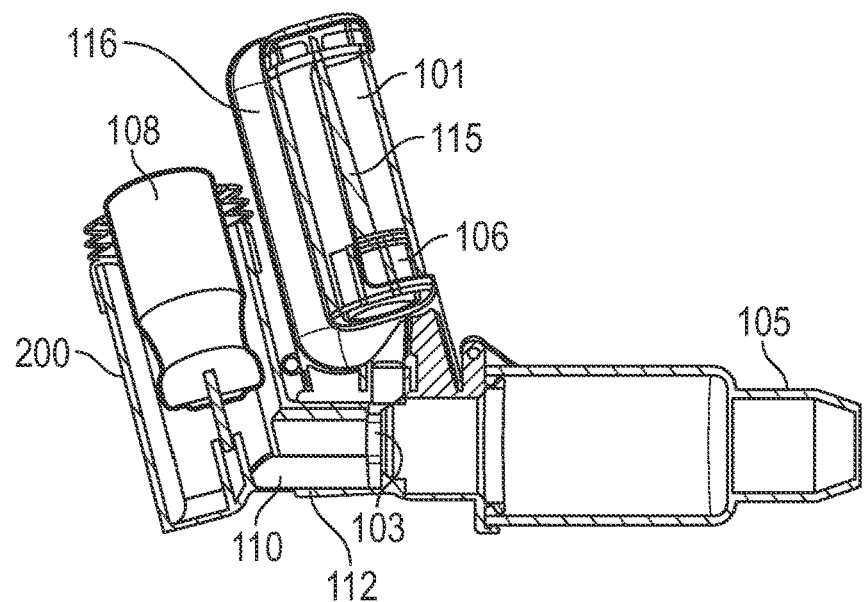
FIG. 10 shows a side view of a spacer device engaged with an inhaler device including a canister in one embodiment of the invention.

FIG. 9 shows a front view of an embodiment of the spacer device of FIGS. 7 and 8. Once an inhaler device 200 is attached to the spacer device and actuated to release a drug into the flow chamber, the user inhales which causes float 106 to rise within the spirometer 101. The float is tethered within the spirometer via a through hole in the float allowing the float to travel up and down spire 115. To begin an inspiratory effort to withdraw the medication from the flow chamber, the patient places mouthpiece 105 into his or her mouth and then begins to inspire. The aerosolized medication then begins to flow through the flow chamber into the mouthpiece. As the patient begins to inspire the aerosolized drug particles through the mouthpiece, air is simultaneously withdrawn from the flow chamber and through entrainment ports 107. This creates a pressure difference within the spirometer chamber, allowing float 106 to rise. As shown in FIG. 10, flow path 116 provides a fluid connection between flow chamber 103 and the upper portion of the spirometer 101.

Figure 11:
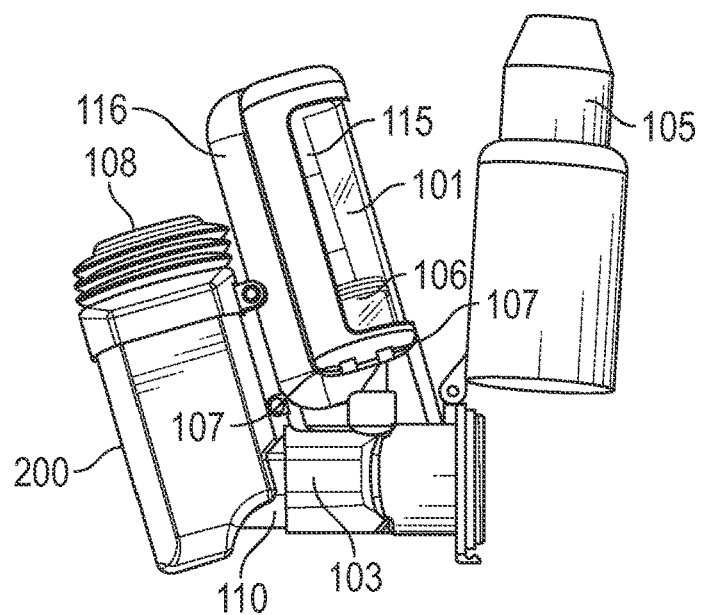
FIG. 11 shows a side view of a spacer device engaged with an inhaler device including a canister in which the mouthpiece is tilted to disengage the flow chamber in one embodiment of the invention.

FIG. 11 show an embodiment of the spacer device comprising a spirometer 101, a flow chamber 103, and a mouthpiece 105, wherein the spirometer further comprises a float 106 and entrainment ports 107, and wherein the mouthpiece may be hingeably attached to the flow chamber 103. The mouthpiece 105 maybe completely removable from the device to allow for cleaning.

Figure 12:
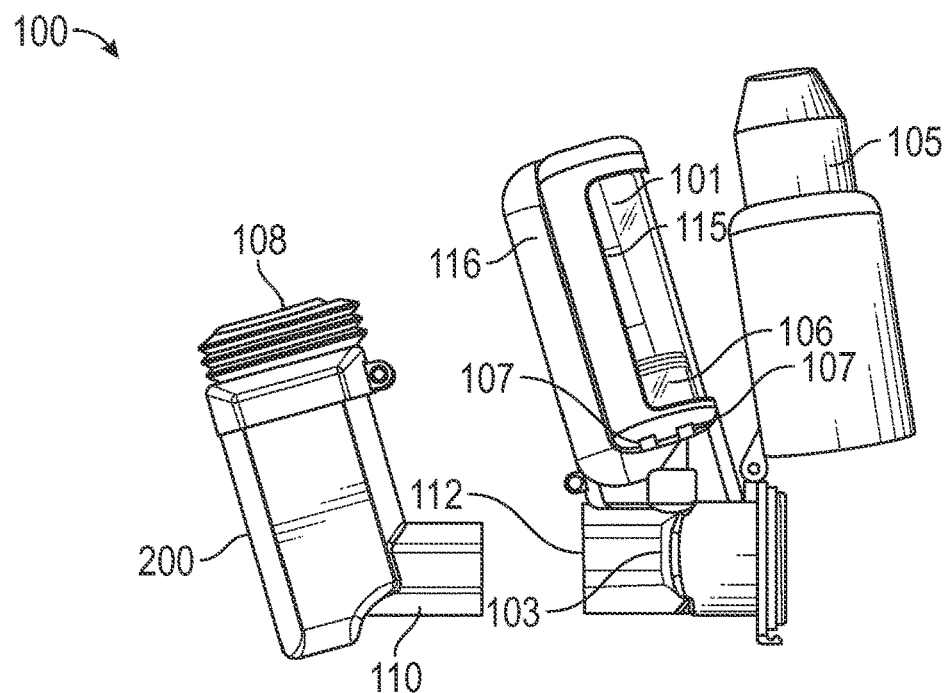
FIG. 12 shows a side view of a spacer device disengaged with an inhaler device in one embodiment of the invention.
Figure 13:
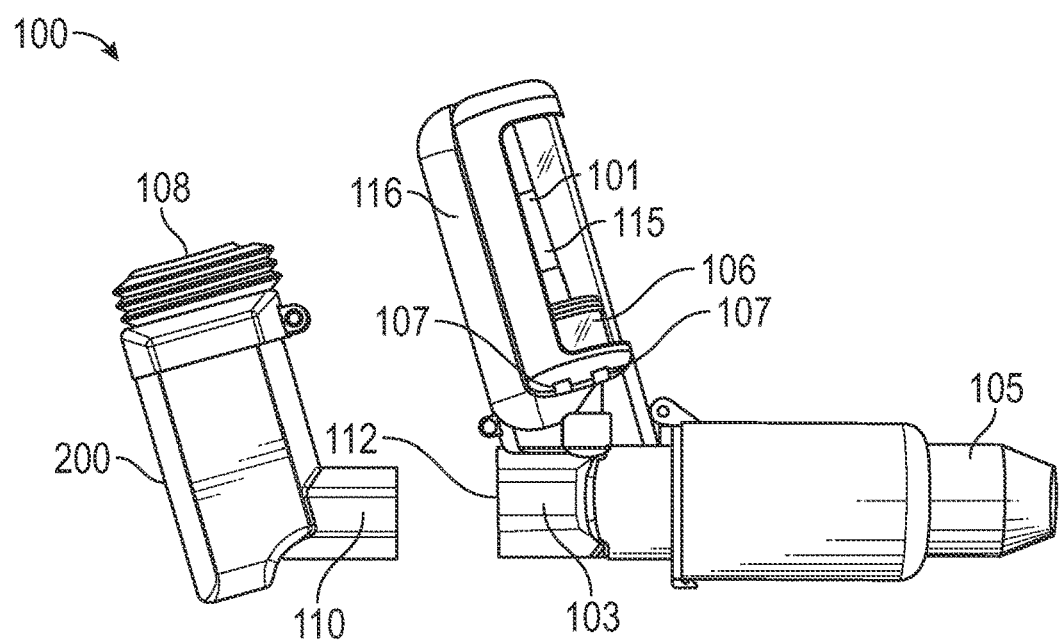
FIG. 13 shows a side view of a spacer device disengaged with an inhaler device in one embodiment of the invention.

FIGS. 12 and 13 show embodiments of the spacer device 100 separated from inhaler device 200 which includes the medicinal fluid canister 108. comprising an opening 109 where an inhaler canister may be attached. Once the inhaler device is attached to the spacer device 100, it may be actuated to release a drug into the flow chamber 103.

The components of the spacer device are preferably made of transparent plastic so that a user of the device may watch the movement of the fluids inside of the chambers of the spacer device during use. The holding chamber 102 has a generally circular reservoir sized to accommodate a conventional inhaler canister 108. In an embodiment of the claimed invention, the reservoir is about 13 centimeters in diameter. A vertical interior wall between the reservoir and the fluid chamber of spirometer 101 separates the two chambers. The flow chamber 103 near bottom of the device allows mist to be drawn from the holding chamber 102 into the mouthpiece 105 as well as into the fluid chamber of the spirometer 101 through a fluid pathway which may be disposed in the lower portion of the fluid chamber of the spirometer 101 when the user inhales upon the mouthpiece 105.

The float 106 is generally shaped to slidably fit within the fluid chamber of the spirometer 101. One or more entrainment ports 107 are located within the wall of the spirometer 101 allowing air from outside of the device to enter into the fluid chamber of the spirometer 101 during use.

In embodiments, mouthpiece 105 is fluidly connected to flow chamber 103 via flow chamber orifice 104, which is a one way valve. The flow chamber orifice 104 used in the device can be of several different designs such as the one way valve disclosed in U.S. Pat. No. 5,385,140. In one embodiment, flow chamber orifice 104 is constructed of a resilient material having a resealable opening.

In various embodiments, flow chamber 103 and mouthpiece 105 are sized to sufficiently slow the flow rate to optimize aerosol intake by the user. For example, the length of the flow chamber and mouthpiece in combination may be up to about 4, 5, 6, 7, 8, 9 or 10 cm in length.

To use the spacer device, the user places the mouthpiece 105 between the user's lips and presses down on the inhaler canister 108, releasing mist into the holding chamber 102 or flow chamber 103. As the user inhales through the mouthpiece 105, a vacuum is created within the device. The vacuum created by the inhalation of the user draws the mist from the holding chamber 102, into the flow chamber 103 and through the flow chamber orifice 104 if present into the user's mouth by way of mouthpiece 105. Alternatively, the vacuum created by the inhalation of the user draws the mist through the flow chamber 103 and through the flow chamber orifice 104 if present into the user's mouth by way of mouthpiece 105.

As the mist is drawn through the spacer device, a pressure difference is created within the fluid chamber of the spirometer 101 across the float 106. The pressure difference across the float 106 causes the float 106 to rise within the fluid chamber when the user inhales upon the mouthpiece 105.

In some embodiments, the float 106 rises after a minimum flow rate of about 30-35 liters per minute is achieved. This is calibrated using the weight of the float and dimensions of the spirometer.

In various embodiments of the invention, the float may take the form of a variety of different geometric shapes, such as a disc, prism, cube, sphere or ellipsoid geometry. The float may be allowed to free float within the spirometer or be tethered within the spirometer, such as by being disposed over an elongated rod or spire 115 with the spirometer as shown in FIG. 9.

In embodiments, the float may be configured to inhibit a user from exceeding a particular flow rate. For example, the spirometer may be configured to allow a maximum flow rate of about 10, 15, 20, 25, 30 or 35 l/min.

In various embodiments, the spacer device of the present invention may be used with a mask, for example a pediatric mask which may be attached to mouthpiece 105.

The disclosed device is not limited to use with respiratory drugs. Rather, it may be used with any drug suitable for delivery by an inhalation route, as it is imperative that any inhalation drug deposits in the peripheral airways and not the oropharynx to achieve clinical effectiveness.

A variety of medicaments may be administered via the spacer device of the invention. Specific active agents or drugs that may be used include, but are not limited to, agents of one or more of the following classes listed below.

Adrenergic agonists such as, for example, amphetamine, apraclonidine, bitolterol, clonidine, colterol, dobutamine, dopamine, ephedrine, epinephrine, ethylnorepinephrine, fenoterol, formoterol, guanabenz, guanfacine, hydroxyamphetamine, isoetharine, isoproterenol, isotharine, mephenterine, metaraminol, methamphetamine, methoxamine, methpentermine, methyldopa, methylphenidate, metaproterenol, metaraminol, mitodrine, naphazoline, norepinephrine, oxymetazoline, pemoline, phenylephrine, phenylethylamine, phenylpropanolamine, pirbuterol, prenalterol, procaterol, propylhexedrine, pseudoephedrine, ritodrine, salbutamol, salmeterol, terbutaline, tetrahydrozoline, tramazoline, tyramine and xylometazoline.

Adrenergic antagonists such as, for example, acebutolol, alfuzosin, atenolol, betaxolol, bisoprolol, bopindolol, bucindolol, bunazosin, butyrophenones, carteolol, carvedilol, celiprolol, chlorpromazine, doxazosin, ergot alkaloids, esmolol, haloperidol, indoramin, ketanserin, labetalol, levobunolol, medroxalol, metipranolol, metoprolol, nebivolol, nadolol, naftopidil, oxprenolol, penbutolol, phenothiazines, phenoxybenzamine, phentolamine, pindolol, prazosin, propafenone, propranolol, sotalol, tamsulosin, terazosin, timolol, tolazoline, trimazosin, urapidil and yohimbine.

Adrenergic neurone blockers such as, for example, bethanidine, debrisoquine, guabenxan, guanadrel, guanazodine, guanethidine, guanoclor and guanoxan.

Drugs for treatment of addiction, such as, for example, buprenorphine.

Drugs for treatment of alcoholism, such as, for example, disulfuram, naloxone and naltrexone.

Drugs for Alzheimer's disease management, including acetylcholinesterase inhibitors such as, for example, donepezil, galantamine, rivastigmine and tacrin.

Anaesthetics such as, for example amethocaine, benzocaine, bupivacaine, hydrocortisone, ketamine, lignocaine, methylprednisolone, prilocaine, proxymetacaine, ropivacaine and tyrothricin.

Angiotensin converting enzyme inhibitors such as, for example, captopril, cilazapril, enalapril, fosinopril, imidapril hydrochloride, lisinopril, moexipril hydrochloride, perindopril, quinapril, ramipril and trandolapril.

Angiotensin II receptor blockers, such as, for example, candesartan, cilexetil, eprosartan, irbesartan, losartan, medoxomil, olmesartan, telmisartan and valsartan.

Antiarrhythmics such as, for example, adenosine, amiodarone, disopyramide, flecainide acetate, lidocaine hydrochloride, mexiletine, procainamide, propafenone and quinidine.

Antibiotic and antibacterial agents (including the beta-lactams, fluoroquinolones, ketolides, macrolides, sulphonamides and tetracyclines) such as, for example, aclarubicin, amoxicillin, amphotericin, azithromycin, aztreonam chlorhexidine, clarithromycin, clindamycin, colistimethate, dactinomycin, dirithromycin, doripenem, erythromycin, fusafungine, gentamycin, metronidazole, mupirocin, natamycin, neomycin, nystatin, oleandomycin, pentamidine, pimaricin, probenecid, roxithromycin, sulphadiazine and triclosan.

Anti-clotting agents such as, for example, abciximab, acenocoumarol, alteplase, aspirin, bemiparin, bivalirudin, certoparin, clopidogrel, dalteparin, danaparoid, dipyridamole, enoxaparin, epoprostenol, eptifibatide, fondaparin, heparin (including low molecular weight heparin), heparin calcium, lepirudin, phenindione, reteplase, streptokinase, tenecteplase, tinzaparin, tirofiban and warfarin.

Anticonvulsants such as, for example, GABA analogs including tiagabine and vigabatrin; barbiturates including pentobarbital; benzodiazepines including alprazolam, chlordiazepoxide, clobazam, clonazepam, diazepam, flurazepam, lorazepam, midazolam, oxazepam and zolazepam; hydantoins including phenyloin; phenyltriazines including lamotrigine; and miscellaneous anticonvulsants including acetazolamide, carbamazepine, ethosuximide, fosphenyloin, gabapentin, levetiracetam, oxcarbazepine, piracetam, pregabalin, primidone, sodium valproate, topiramate, valproic acid and zonisamide.

Antidepressants such as, for example, tricyclic and tetracyclic antidepressants including amineptine, amitriptyline (tricyclic and tetracyclic amitryptiline), amoxapine, butriptyline, cianopramine, clomipramine, demexiptiline, desipramine, dibenzepin, dimetacrine, dosulepin, dothiepin, doxepin, imipramine, iprindole, levoprotiline, lofepramine, maprotiline, melitracen, metapramine, mianserin, mirtazapine, nortryptiline, opipramol, propizepine, protriptyline, quinupramine, setiptiline, tianeptine and trimipramine; selective serotonin and noradrenaline reuptake inhibitors (SNRIs) including clovoxamine, duloxetine, milnacipran and venlafaxine; selective serotonin reuptake inhibitors (SSRIs) including citalopram, escitalopram, femoxetine, fluoxetine, fluvoxamine, ifoxetine, milnacipran, nomifensine, oxaprotiline, paroxetine, sertraline, sibutramine, venlafaxine, viqualine and zimeldine; selective noradrenaline reuptake inhibitors (NARIs) including demexiptiline, desipramine, oxaprotiline and reboxetine; noradrenaline and selective serotonin reuptake inhibitors (NASSAs) including mirtazapine; monoamine oxidase inhibitors (MAOIs) including amiflamine, brofaromine, clorgyline, .alpha.-ethyltryptamine, etoperidone, iproclozide, iproniazid, isocarboxazid, mebanazine, medifoxamine, moclobemide, nialamide, pargyline, phenelzine, pheniprazine, pirlindole, procarbazine, rasagiline, safrazine, selegiline, toloxatone and tranylcypromine; muscarinic antagonists including benactyzine and dibenzepin; azaspirones including buspirone, gepirone, ipsapirone, tandospirone and tiaspirone; and other antidepressants including acetaphenazine, ademetionine, S-adenosylmethionine, adrafinil, amesergide, amineptine, amperozide, benactyzine, benmoxine, binedaline, bupropion, carbamazepine, caroxazone, cericlamine, cotinine, fezolamine, flupentixol, idazoxan, kitanserin, levoprotiline, lithium salts, maprotiline, medifoxamine, methylphenidate, metralindole, minaprine, nefazodone, nisoxetine, nomifensine, oxaflozane, oxitriptan, phenyhydrazine, rolipram, roxindole, sibutramine, teniloxazine, tianeptine, tofenacin, trazadone, tryptophan, viloxazine and zalospirone.

Anticholinergic agents such as, for example, atropine, benzatropine, biperiden, cyclopentolate, glycopyrrolate, hyoscine, ipratropium bromide, orphenadine hydrochloride, oxitroprium bromide, oxybutinin, pirenzepine, procyclidine, propantheline, propiverine, telenzepine, tiotropium, trihexyphenidyl, tropicamide and trospium.

Antidiabetic agents such as, for example, pioglitazone, rosiglitazone and troglitazone.

Antidotes such as, for example, deferoxamine, edrophonium chloride, fiumazenil, nalmefene, naloxone, and naltrexone.

Anti-emetics such as, for example, alizapride, azasetron, benzquinamide, bestahistine, bromopride, buclizine, chlorpromazine, cinnarizine, clebopride, cyclizine, dimenhydrinate, diphenhydramine, diphenidol, domperidone, dolasetron, dronabinol, droperidol, granisetron, hyoscine, lorazepam, metoclopramide, metopimazine, nabilone, ondansetron, palonosetron, perphenazine, prochlorperazine, promethazine, scopolamine, triethylperazine, trifluoperazine, triflupromazine, trimethobenzamide and tropisetron.

Antihistamines such as, for example, acrivastine, astemizole, azatadine, azelastine, brompheniramine, carbinoxamine, cetirizine, chlorpheniramine, cinnarizine, clemastine, cyclizine, cyproheptadine, desloratadine, dexmedetomidine, diphenhydramine, doxylamine, fexofenadine, hydroxyzine, ketotifen, levocabastine, loratadine, mizolastine, promethazine, pyrilamine, terfenadine and trimeprazine.

Anti-infective agents such as, for example, antivirals (including nucleoside and non-nucleoside reverse transcriptase inhibitors and protease inhibitors) including aciclovir, adefovir, amantadine, cidofovir, efavirenz, famiciclovir, foscarnet, ganciclovir, idoxuridine, indinavir, inosine pranobex, lamivudine, nelfinavir, nevirapine, oseltamivir, palivizumab, penciclovir, pleconaril, ribavirin, rimantadine, ritonavir, ruprintrivir, saquinavir, stavudine, valaciclovir, zalcitabine, zanamivir, zidovudine and interferons; AIDS adjunct agents including dapsone; aminoglycosides including tobramycin; antifungals including amphotericin, caspofungin, clotrimazole, econazole nitrate, fluconazole, itraconazole, ketoconazole, miconazole, nystatin, terbinafine and voriconazole; anti-malarial agents including quinine; antituberculosis agents including capreomycin, ciprofloxacin, ethambutol, meropenem, piperacillin, rifampicin and vancomycin; beta-lactams including cefazolin, cefmetazole, cefoperazone, cefoxitin, cephacetrile, cephalexin, cephaloglycin and cephaloridine; cephalosporins, including cephalosporin C and cephalothin; cephamycins such as cephamycin A, cephamycin B, cephamycin C, cephapirin and cephradine; leprostatics such as clofazimine; penicillins including amoxicillin, ampicillin, amylpenicillin, azidocillin, benzylpenicillin, carbenicillin, carfecillin, carindacillin, clometocillin, cloxacillin, cyclacillin, dicloxacillin, diphenicillin, heptylpenicillin, hetacillin, metampicillin, methicillin, nafcillin, 2-pentenylpenicillin, penicillin N, penicillin O, penicillin S and penicillin V; quinolones including ciprofloxacin, clinafloxacin, difloxacin, grepafloxacin, norfloxacin, ofloxacine and temafloxacin; tetracyclines including doxycycline and oxytetracycline; miscellaneous anti-infectives including linezolide, trimethoprim and sulfamethoxazole.

Anti-neoplastic agents such as, for example, droloxifene, tamoxifen and toremifene.

Antiparkisonian drugs such as, for example, amantadine, andropinirole, apomorphine, baclofen, benserazide, biperiden, benztropine, bromocriptine, budipine, cabergoline, carbidopa, eliprodil, entacapone, eptastigmine, ergoline, galanthamine, lazabemide, levodopa, lisuride, mazindol, memantine, mofegiline, orphenadrine, trihexyphenidyl, pergolide, piribedil, pramipexole, procyclidine, propentofylline, rasagiline, remacemide, ropinerole, selegiline, spheramine, terguride and tolcapone.

Antipsychotics such as, for example, acetophenazine, alizapride, amisulpride, amoxapine, amperozide, aripiprazole, benperidol, benzquinamide, bromperidol, buramate, butaclamol, butaperazine, carphenazine, carpipramine, chlorpromazine, chlorprothixene, clocapramine, clomacran, clopenthixol, clospirazine, clothiapine, clozapine, cyamemazine, droperidol, flupenthixol, fluphenazine, fluspirilene, haloperidol, loxapine, melperone, mesoridazine, metofenazate, molindrone, olanzapine, penfluridol, pericyazine, perphenazine, pimozide, pipamerone, piperacetazine, pipotiazine, prochlorperazine, promazine, quetiapine, remoxipride, risperidone, sertindole, spiperone, sulpiride, thioridazine, thiothixene, trifluperidol, triflupromazine, trifluoperazine, ziprasidone, zotepine and zuclopenthixol; phenothiazines including aliphatic compounds, piperidines and piperazines; thioxanthenes, butyrophenones and substituted benzamides.

Antirheumatic agents such as, for example, diclofenac, heparinoid, hydroxychloroquine and methotrexate, leflunomide and teriflunomide.

Anxiolytics such as, for example, adinazolam, alpidem, alprazolam, alseroxlon, amphenidone, azacyclonol, bromazepam, bromisovalum, buspirone, captodiamine, capuride, carbcloral, carbromal, chloral betaine, chlordiazepoxide, clobenzepam, enciprazine, flesinoxan, flurazepam, hydroxyzine, ipsapiraone, lesopitron, loprazolam, lorazepam, loxapine, mecloqualone, medetomidine, methaqualone, methprylon, metomidate, midazolam, oxazepam, propanolol, tandospirone, trazadone, zolpidem and zopiclone.

Appetite stimulants such as, for example, dronabinol.

Appetite suppressants such as, for example, fenfluramine, phentermine and sibutramine; and anti-obesity treatments such as, for example, pancreatic lipase inhibitors, serotonin and norepinephrine re-uptake inhibitors, and anti-anorectic agents.

Benzodiazepines such as, for example, alprazolam, bromazepam, brotizolam, chlordiazepoxide, clobazam, clonazepam, clorazepate, demoxepam, diazepam, estazolam, flunitrazepam, flurazepam, halazepam, ketazolam, loprazolam, lorazepam, lormetazepam, medazepam, midazolam, nitrazepam, nordazepam, oxazepam, prazepam, quazepam, temazepam and triazolam.

Bisphosphonates such as, for example, alendronate sodium, sodium clodronate, etidronate disodium, ibandronic acid, pamidronate disodium, isedronate sodium, tiludronic acid and zoledronic acid.

Blood modifiers such as, for example, cilostazol and dipyridamol, and blood factors.

Cardiovascular agents such as, for example, acebutalol, adenosine, amiloride, amiodarone, atenolol, benazepril, bisoprolol, bumetanide, candesartan, captopril, clonidine, diltiazem, disopyramide, dofetilide, doxazosin, enalapril, esmolol, ethacrynic acid, flecanide, furosemide, gemfibrozil, ibutilide, irbesartan, labetolol, losartan, lovastatin, metolazone, metoprolol, mexiletine, nadolol, nifedipine, pindolol, prazosin, procainamide, propafenone, propranolol, quinapril, quinidine, ramipril, sotalol, spironolactone, telmisartan, tocamide, torsemide, triamterene, valsartan and verapamil.

Calcium channel blockers such as, for example, amlodipine, bepridil, diltiazem, felodipine, flunarizine, gallopamil, isradipine, lacidipine, lercanidipine, nicardipine, nifedipine, nimodipine and verapamil.

Central nervous system stimulants such as, for example, amphetamine, brucine, caffeine, dexfenfluramine, dextroamphetamine, ephedrine, fenfluramine, mazindol, methylphenidate, modafmil, pemoline, phentermine and sibutramine.

Cholesterol-lowering drugs such as, for example, acipimox, atorvastatin, ciprofibrate, colestipol, colestyramine, bezafibrate, ezetimibe, fenofibrate, fluvastatin, gemfibrozil, ispaghula, nictotinic acid, omega-3 triglycerides, pravastatin, rosuvastatin and simvastatin.

Drugs for cystic fibrosis management such as, for example, *Pseudomonas aeruginosa* infection vaccines (e.g., Aerugen™), alpha 1-antitripsin, amikacin, cefadroxil, denufosol, duramycin, glutathione, mannitol, and tobramycin.

Diagnostic agents such as, for example, adenosine and aminohippuric acid.

Dietary supplements such as, for example, melatonin and vitamins including vitamin E.

Diuretics such as, for example, amiloride, bendroflumethiazide, bumetanide, chlortalidone, cyclopenthiazide, furosemide, indapamide, metolazone, spironolactone and torasemide.

Dopamine agonists such as, for example, amantadine, apomorphine, bromocriptine, cabergoline, lisuride, pergolide, pramipexole and ropinerole.

Drugs for treating erectile dysfunction, such as, for example, apomorphine, apomorphine diacetate, moxisylyte, phentolamine, phosphodiesterase type 5 inhibitors, such as sildenafil, tadalafil, vardenafil and yohimbine.

Gastrointestinal agents such as, for example, atropine, hyoscyamine, famotidine, lansoprazole, loperamide, omeprazole and rebeprazole.

Hormones and analogues such as, for example, cortisone, epinephrine, estradiol, insulin, Ostabolin-C, parathyroid hormone and testosterone.

Hormonal drugs such as, for example, desmopressin, lanreotide, leuprolide, octreotide, pegvisomant, protirelin, salcotonin, somatropin, tetracosactide, thyroxine and vasopressin.

Hypoglycaemics such as, for example, sulphonylureas including glibenclamide, gliclazide, glimepiride, glipizide and gliquidone; biguanides including metformin; thiazolidinediones including pioglitazone, rosiglitazone, nateglinide, repaglinide and acarbose.

Immunoglobulins.

Immunomodulators such as, for example, interferon (e.g. interferon beta-la and interferon beta-1b) and glatiramer.

Immunosupressives such as, for example, azathioprine, cyclosporin, mycophenolic acid, rapamycin, sirolimus and tacrolimus.

Mast cell stabilizers such as, for example, cromoglycate, iodoxamide, nedocromil, ketotifen, tryptase inhibitors and pemirolast.

Drugs for treatment of migraine headaches such as, for example, almotriptan, alperopride, amitriptyline, amoxapine, atenolol, clonidine, codeine, coproxamol, cyproheptadine, dextropropoxypene, dihydroergotamine, diltiazem, doxepin, ergotamine, eletriptan, fluoxetine, frovatriptan, isometheptene, lidocaine, lisinopril, lisuride, loxapine, methysergide, metoclopramide, metoprolol, nadolol, naratriptan, nortriptyline, oxycodone, paroxetine, pizotifen, pizotyline, prochlorperazine propanolol, propoxyphene, protriptyline, rizatriptan, sertraline, sumatriptan, timolol, tolfenamic acid, tramadol, verapamil, zolmitriptan, and nonsteroidal anti-inflammatory drugs.

Drugs for treatment of motion sickness such as, for example, diphenhydramine, promethazine and scopolamine.

Mucolytic agents such as N-acetylcysteine, ambroxol, amiloride, dextrans, heparin, desulphated heparin, low molecular weight heparin and recombinant human DNase.

Drugs for multiple sclerosis management such as, for example, bencyclane, methylprednisolone, mitoxantrone and prednisolone.

Muscle relaxants such as, for example, baclofen, chlorzoxazone, cyclobenzaprine, methocarbamol, orphenadrine, quinine and tizanidine.

NMDA receptor antagonists such as, for example, mementine.

Nonsteroidal anti-inflammatory agents such as, for example, aceclofenac, acetaminophen, alminoprofen, amfenac, aminopropylon, amixetrine, aspirin, benoxaprofen, bromfenac, bufexamac, carprofen, celecoxib, choline, cinchophen, cinmetacin, clometacin, clopriac, diclofenac, diclofenac sodium, diflunisal, ethenzamide, etodolac, etoricoxib, fenoprofen, flurbiprofen, ibuprofen, indomethacin, indoprofen, ketoprofen, ketorolac, loxoprofen, mazipredone, meclofenamate, mefenamic acid, meloxicam, nabumetone, naproxen, nimesulide, parecoxib, phenylbutazone, piroxicam, pirprofen, rofecoxib, salicylate, sulindac, tiaprofenic acid, tolfenamate, tolmetin and valdecoxib.

Nucleic-acid medicines such as, for example, oligonucleotides, decoy nucleotides, antisense nucleotides and other gene-based medicine molecules.

Opiates and opioids such as, for example, alfentanil, allylprodine, alphaprodine, anileridine, benzylmorphine, bezitramide, buprenorphine, butorphanol, carbiphene, cipramadol, clonitazene, codeine, codeine phosphate, dextromoramide, dextropropoxyphene, diamorphine, dihydrocodeine, dihydromorphine, diphenoxylate, dipipanone, fentanyl, hydromorphone, L-alpha acetyl methadol, levorphanol, lofentanil, loperamide, meperidine, meptazinol, methadone, metopon, morphine, nalbuphine, nalorphine, oxycodone, papavereturn, pentazocine, pethidine, phenazocine, pholcodeine, remifentanil, sufentanil, tramadol, and combinations thereof with an anti-emetic.

Opthalmic preparations such as, for example, betaxolol and ketotifen.

Osteoporosis preparations such as, for example, alendronate, estradiol, estropitate, raloxifene and risedronate.

Other analgesics such as, for example, apazone, benzpiperylon, benzydamine, caffeine, cannabinoids, clonixin, ethoheptazine, flupirtine, nefopam, orphenadrine, pentazocine, propacetamol and propoxyphene.

Other anti-inflammatory agents such as, for example, B-cell inhibitors, p38 MAP kinase inhibitors and TNF inhibitors.

Phosphodiesterase inhibitors such as, for example, non-specific phosphodiesterase inhibitors including theophylline, theobromine, IBMX, pentoxifylline and papaverine; phosphodiesterase type 3 inhibitors including bipyridines such as milrinone, aminone and olprinone; imidazolones such as piroximone and enoximone; imidazolines such as imazodan and 5-methyl-imazodan; imidazo-quinoxalines; and dihydropyridazinones such as indolidan and LY181512 (5-(6-oxo-1,4,5,6-tetrahydro-pyridazin-3-yl)-1,3-dihydro-indol-2-one); dihydroquinolinone compounds such as cilostamide, cilostazol, and vesnarinone); motapizone; phosphodiesterase type 4 inhibitors such as cilomilast, etazolate, rolipram, oglemilast, roflumilast, ONO 6126, tolafentrine and zardaverine, and including quinazolinediones such as nitraquazone and nitraquazone analogs; xanthine derivatives such as denbufylline and arofylline; tetrahydropyrimidones such as atizoram; and oxime carbamates such as filaminast; and phosphodiesterase type 5 inhibitors including sildenafil, zaprinast, vardenafil, tadalafil, dipyridamole, and the compounds described in WO 01/19802, particularly (S)-2-(2-hydroxymethyl-1-pyrrolidinyl)-4-(3-chloro-4-methoxy-benzylamino)- -5-[N-(2-pyrimidinylmethyl)carbamoyl] pyrimidine, 2-(5,6,7,8-tetrahydro-1,7-naphthyridin-7-yl)-4-(3-chloro-4-methoxybenzyla-mino)-5-[N-(2-morpholin-oethyl)carbamoyl]-pyrimidine, and (S)-2-(2-hydroxymethyl-1-pyrrolidinyl)-4-(3-chloro-4-methoxy-benzylamino)- -5-[N-(1,3,5-trimethyl-4-pyrazolyl)carbamoyl]-pyrimidine).

Potassium channel modulators such as, for example, cromakalim, diazoxide, glibenclamide, levcromakalim, minoxidil, nicorandil and pinacidil.

Prostaglandins such as, for example, alprostadil, dinoprostone, epoprostanol and misoprostol.

Respiratory agents and agents for the treatment of respiratory diseases including β-agonists, such as bronchodilators, for example, the β2-agonists albuterol, bambuterol, bitolterol, broxaterol, carmoterol, clenbuterol, fenoterol, formoterol, indacaterol, levalbuterol, metaproterenol, orciprenaline, picumeterol, pirbuterol, procaterol, reproterol, rimiterol, salbutamol, salmeterol, terbutaline and the like; inducible nitric oxide synthase (iNOS) inhibitors; the anti-muscarinics ipratropium, ipratropium bromide, oxitropium, tiotropium, glycopyrrolate and the like; the xanthines aminophylline, theophylline and the like; adenosine receptor antagonists, cytokines such as, for example, interleukins and interferons; cytokine antagonists and chemokine antagonists including cytokine synthesis inhibitors, endothelin receptor antagonists, elastase inhibitors, integrin inhibitors, leukotrine receptor antagonists, prostacyclin analogues, and ablukast, ephedrine, epinephrine, fenleuton, iloprost, iralukast, isoetharine, isoproterenol, montelukast, ontazolast, pranlukast, pseudoephedrine, sibenadet, tepoxalin, verlukast, zafirlukast and zileuton.

Sedatives and hypnotics such as, for example, alprazolam, butalbital, chlordiazepoxide, diazepam, estazolam, flunitrazepam, flurazepam, lorazepam, midazolam, temazepam, triazolam, zaleplon, zolpidem, and zopiclone.

Serotonin agonists such as, for example, 1-(4-bromo-2,5-dimethoxyphenyl)-2-aminopropane, buspirone, m-chlorophenylpiperazine, cisapride, ergot alkaloids, gepirone, 8-hydroxy-(2-N,N-dipropylamino)-tetraline, ipsaperone, lysergic acid diethylamide, 2-methyl serotonin, mezacopride, sumatriptan, tiaspirone, trazodone and zacopride.

Serotonin antagonists such as, for example, amitryptiline, azatadine, chlorpromazine, clozapine, cyproheptadine, dexfenfluramine, R(+)-α-(2,3-dimethoxyphenyl)-1-[2-(4-fluorophenyl)ethyl]-4-piperidine-methanol, dolasetron, fenclonine, fenfluramine, granisetron, ketanserin, methysergide, metoclopramide, mianserin, ondansetron, risperidone, ritanserin, trimethobenzamide and tropisetron.

Steroid drugs such as, for example, alcometasone, beclomethasone, beclomethasone dipropionate, betamethasone, budesonide, butixocort, ciclesonide, clobetasol, deflazacort, diflucortolone, desoxymethasone, dexamethasone, fludrocortisone, flunisolide, fluocinolone, fluometholone, fluticasone, fluticasone proprionate, hydrocortisone, methylprednisolone, mometasone, nandrolone decanoate, neomycin sulphate, prednisolone, rimexolone, rofleponide, triamcinolone and triamcinolone acetonide.

Sympathomimetic drugs such as, for example, adrenaline, dexamfetamine, dipirefin, dobutamine, dopamine, dopexamine, isoprenaline, noradrenaline, phenylephrine, pseudoephedrine, tramazoline and xylometazoline.

Nitrates such as, for example, glyceryl trinitrate, isosorbide dinitrate and isosorbide mononitrate.

Skin and mucous membrane agents such as, for example, bergapten, isotretinoin and methoxsalen.

Smoking cessation aids such as, for example, bupropion, nicotine and varenicline.

Drugs for treatment of Tourette's syndrome such as, for example, pimozide.

Drugs for treatment of urinary tract infections such as, for example, darifenicin, oxybutynin, propantheline bromide and tolteridine.

Vaccines.

Drugs for treating vertigo such as, for example, betahistine and meclizine.

Therapeutic proteins and peptides such as acylated insulin, glucagon, glucagon-like peptides, exendins, insulin, insulin analogues, insulin aspart, insulin detemir, insulin glargine, insulin glulisine, insulin lispro, insulin zinc, isophane insulins, neutral, regular and insoluble insulins, and protamine zinc insulin.

Anticancer agents such as, for example, anthracyclines, doxorubicin, idarubicin, epirubicin, methotrexate, taxanes, paclitaxel, docetaxel, cisplatin, vinca alkaloids, vincristine and 5-fluorouracil.

Pharmaceutically acceptable salts or derivatives of any of the foregoing.

It should be noted that drugs listed above under a particular indication or class may also find utility in other indications. A plurality of active agents can be employed in the practice of the present invention. An device according to the invention may also be used to deliver combinations of two, three or more different active agents or drugs.

It will be clear to a person of skill in the art that, where appropriate, the active agents or drugs may be linked to a carrier molecule or molecules and/or used in the form of prodrugs, salts, as esters, or as solvates to optimize the activity and/or stability of the active agent or drug.

The following examples are provided to further illustrate the advantages and features of the present invention, but are not intended to limit the scope of the invention. While they are typical of those that might be used, other procedures, methodologies, or techniques known to those skilled in the art may alternatively be used.

EXAMPLE 1

Flow Rate Testing

The spacer device shown in FIGS. 7-13 is to be tested for MDI Aerosol Performance. The test is performed with albuterol sulfate and the following parameters will be evaluated and compared to a conventional spacer device such as the AeroChamber Plus Z STAT™ and AIRIAL™ Holding Chamber. Parameter include: Mass Median Aerodynamic Diameter (MMAD), Geometric Standard Deviation (GSD), Total Dose, Respirable Fraction, and Respirable Mass Cascade impactor method per USP <601> and USP throat at continuous 28 l/min. It is expected that superior pulmonary delivery of medication will be achieved as compared to the conventional spacers with an optimal flow rate of about 30-35 liters per minute.

Although the invention has been described with reference to the above example, it will be understood that modifications and variations are encompassed within the spirit and scope of the invention. Accordingly, the invention is limited only by the following claims.

What is claimed is:

1. A system, comprising:
a pressurized metered dose inhaler device;
a spacer device configured to be operably coupled to the pressurized metered dose inhaler device, the spacer device comprising:
a main body extending from a first end to a second end and defining a longitudinal axis;
a flow chamber comprising a generally circular reservoir sized to accommodate the pressurized metered dose inhaler device, the flow chamber disposed continuously through the main body from the first end to the second end along the longitudinal axis, the flow chamber being less than 10 cm in length as measured along the longitudinal axis;
a mouthpiece in fluid communication with the flow chamber, the mouthpiece configured to be aligned with the longitudinal axis during use of the spacer device; and
a spirometer coupled to the main body, the spirometer comprising:
a fluid chamber having an upper portion and a lower portion along an elongated central axis, the fluid chamber being in fluid communication with the flow chamber via a fluid pathway;
a float slidably disposed within the fluid chamber; and
an entrainment port disposed within a wall of the lower portion of the fluid chamber, wherein:
the spacer device is configured such that drawing a fluid through the mouthpiece draws the fluid through the flow chamber and the entrainment port, thereby generating a pressure difference within the fluid chamber causing the float to move toward the upper portion of the fluid chamber,
the float is configured as an indicator of flow rate during operation of the spacer device,
the flow chamber comprises an opening for receiving the mouthpiece of the pressurized metered dose inhaler device, the opening for receiving the mouthpiece of the pressurized metered dose inhaler device being arranged opposite the mouthpiece of the spacer device and in fluid communication with the flow chamber,
wherein the pressurized metered dose inhaler device is configured to be used by a user with and without the spacer device.

2. The system of claim 1, wherein the pressurized metered dose inhaler device comprises a holding chamber having a reservoir and an opening sized to receive a medicinal fluid canister, the reservoir being in fluid communication with the flow chamber in response to coupling the mouthpiece of the pressurized metered dose inhaler device to the opening for receiving the mouthpiece of the pressurized metered dose inhaler device.

3. The system of claim 1, wherein the float comprises a disc, prism, cube, sphere or ellipsoid geometry.

4. The system of claim 3, wherein the float comprises a disc geometry.

5. The system of claim 1, wherein the spacer device further comprises one or more additional indicators of a flow rate of the fluid.

6. The system of claim 5, wherein the one or more additional indicators are visual or sound indicators.

7. The system of claim 1, wherein the fluid pathway enters the lower portion of the fluid chamber of the spirometer.

8. The system of claim 1, wherein the fluid pathway enters the upper portion of the fluid chamber of the spirometer.

9. The system of claim 1, wherein the spirometer comprises a plurality of entrainment ports.

10. A method of administering a medicinal agent to a subject, comprising administering the medicinal agent to a pulmonary tract of the subject using the system of claim 1, thereby administering the medicinal agent.

11. The method of claim 10, wherein the spirometer provides the subject with an indicator of optimal flow rate during the administering the medicinal agent.

12. The method of claim 10, wherein a flow rate of the fluid is about 30 liters per minute.

13. The method of claim 10, wherein the medicinal agent is administered daily.

14. A method of treating a disease or disorder in a subject, comprising administering a medicinal agent to a pulmonary tract of the subject using the system of claim 1, thereby treating the subject.

15. The method of claim 14, wherein the spirometer provides the subject with an indicator of optimal flow rate during the administering the medicinal agent.

16. The method of claim 14, wherein a flow rate of the fluid is about 30 liters per minute.

17. The method of claim 14, wherein the medicinal agent is administered daily.

18. The method of claim 14, wherein the disease or disorder is asthma.

19. The spacer device of claim 1, wherein the float comprises a piston-type float that is slidably disposed on a spire within the fluid chamber, the spire engaging a hole on the float and allowing the float to travel up and down the spire.

20. The spacer device of claim 1, wherein the spirometer further comprises a transparent window disposed within a wall of the fluid chamber to allow visual inspection of the float.

21. The spacer device of claim 1, wherein an internal resistance of the spirometer is configured to provide a laminar flow of fluid through the mouthpiece.

22. A method of administering a medicinal agent to a subject, the method comprising:

coupling a mouthpiece of a pressurized metered dose inhaler device to an opening of a spacer device, the opening of the spacer device arranged opposite the mouthpiece of the spacer device and in fluid communication with a flow chamber of the spacer device, the spacer device comprising a spirometer and a main body that extends from a first end to a second end and defines a longitudinal axis, a fluid chamber of the spirometer having an upper portion and a lower portion along an elongated central axis, the fluid chamber being in fluid communication with the flow chamber of the pressurized metered dose inhaler device via a fluid pathway, the flow chamber extending from the opening of the spacer device to the mouthpiece of the pressurized metered dose inhaler device, the flow chamber disposed continuously through the main body from the first end to the second end along the longitudinal axis, the flow chamber being less than 10 cm in length as measured along the longitudinal axis;

actuating the pressurized metered dose inhaler device to release a drug into the flow chamber to administer the medicinal agent to a pulmonary tract of the subject;

responsive to the actuating the pressurized metered dose inhaler device, generating a vacuum by inhalation of the subject and drawing a mist of the medicinal agent through the flow chamber into a mouth of the subject by way of the mouthpiece of the spacer device;

responsive to a pressure difference across a float of the spirometer exceeding a threshold flow rate, causing the float to rise within the fluid chamber during the inhalation; and responsive to the subject exceeding a maximum flow rate during the inhalation, providing a visual indication that the subject exceeded the maximum flow rate, the maximum flow rate being about 35 liters per minute, wherein the pressurized metered dose inhaler device is configured to be used by a user with and without the spacer device.

23. The method of claim 22, wherein the visual indication is provided through a transparent window of the spirometer to the subject.

* * * * *